US011769341B2

(12) United States Patent
Seth et al.

(10) Patent No.: US 11,769,341 B2
(45) Date of Patent: Sep. 26, 2023

(54) SYSTEM AND METHOD TO EXTRACT INFORMATION FROM UNSTRUCTURED IMAGE DOCUMENTS

(71) Applicant: Ushur, Inc., Santa Clara, CA (US)

(72) Inventors: Yashu Seth, Patna (IN); Ravil Kashyap, Bangalore (IN); Shaik Kamran Moinuddin, Bangalore (IN); Vijayendra Mysore Shamanna, Bangalore (IN); Henry Thomas Peter, Mountain House, CA (US); Simha Sadasiva, San Jose, CA (US)

(73) Assignee: Ushur, Inc., Santa Clara, CA (US)

( * ) Notice: Subject to any disclaimer, the term of this patent is extended or adjusted under 35 U.S.C. 154(b) by 238 days.

(21) Appl. No.: 17/405,964

(22) Filed: Aug. 18, 2021

(65) Prior Publication Data
US 2022/0058383 A1 Feb. 24, 2022

Related U.S. Application Data

(60) Provisional application No. 63/067,714, filed on Aug. 19, 2020.

(51) Int. Cl.
*G06V 30/40* (2022.01)
*G06T 7/10* (2017.01)
(Continued)

(52) U.S. Cl.
CPC .............. *G06V 30/40* (2022.01); *G06F 18/24* (2023.01); *G06T 7/10* (2017.01); *G06V 10/95* (2022.01);
(Continued)

(58) Field of Classification Search
CPC ...... G06V 30/40; G06V 10/95; G06V 30/148; G06V 30/19107; G06V 30/19173;
(Continued)

(56) References Cited

U.S. PATENT DOCUMENTS 8,000,956 B2 8/2011 Brun et al.
9,009,134 B2 4/2015 Xu et al.
(Continued)

OTHER PUBLICATIONS

Hirotaka Funayama et al., "Bottom-up Named Entity Recognition using a Two-stage Machine Learning Method", Proceedings of the 2009 Workshop on Multiword Expressions, ACL-IJCNLP, pp. 55-62, Aug. 6, 2009, Suntec, Singapore.
(Continued)

*Primary Examiner* — King Y Poon
*Assistant Examiner* — Michael L Burleson
(74) *Attorney, Agent, or Firm* — Lowenstein Sandler LLP; Madhumita Datta (57) ABSTRACT

The present disclosure relates to a system and method to extract information from unstructured image documents. The extraction technique is content-driven and not dependent on the layout of a particular image document type. The disclosed method breaks down an image document into smaller images using the text cluster detection algorithm. The smaller images are converted into text samples using optical character recognition (OCR). Each of the text samples is fed to a trained machine learning model. The model classifies each text sample into one of a plurality of pre-determined field types. The desired value extraction problem may be converted into a question-answering problem using a pre-trained model. A fixed question is formed on the basis of the classified field type. The output of the question-answering model may be passed through a rule-based post-processing step to obtain the final answer.

14 Claims, 9 Drawing Sheets (51) Int. Cl.
*G06V 10/94* (2022.01)
*G06F 18/24* (2023.01)
*G06V 30/19* (2022.01)
*G06V 30/148* (2022.01)

(52) U.S. Cl.
CPC ...... *G06V 30/148* (2022.01); *G06V 30/19107* (2022.01); *G06V 30/19173* (2022.01); *G06T 2207/30176* (2013.01)

(58) Field of Classification Search
CPC ......... G06V 30/414; G06F 18/24; G06T 7/10; G06T 2207/30176
See application file for complete search history.

(56) References Cited

U.S. PATENT DOCUMENTS

| | | | |
|---|---|---|---|
| 9,009,153 | B2 | 4/2015 | Khan et al. |
| 9,190,055 | B1 | 11/2015 | Kiss et al. |
| 10,095,944 | B2* | 10/2018 | Sharma .................. G06F 18/23 |
| 2003/0086611 | A1* | 5/2003 | Loudon .................. G06V 30/36 382/187 |
| 2005/0060301 | A1 | 3/2005 | Seki et al. |
| 2007/0239638 | A1 | 10/2007 | Zhuang et al. |
| 2008/0052262 | A1 | 2/2008 | Kosinov et al. |
| 2009/0222395 | A1 | 9/2009 | Light et al. |
| 2009/0287678 | A1 | 11/2009 | Brown et al. |
| 2015/0063699 | A1 | 3/2015 | Wu |
| 2015/0154464 | A1 | 6/2015 | Manmatha et al. |
| 2016/0071022 | A1* | 3/2016 | Bruno .................. G06N 20/00 706/12 |
| 2016/0269472 | A1* | 9/2016 | Byron .................. G06F 16/345 |
| 2017/0308790 | A1 | 10/2017 | Nogueira dos Santos et al. |
| 2021/0133391 | A1* | 5/2021 | Foncubierta Rodriguez ............... G06F 40/186 |
| 2021/0201018 | A1* | 7/2021 | Patel .................. G06Q 30/0201 |
| 2021/0319093 | A1* | 10/2021 | Molloy .................. G06N 3/045 |

OTHER PUBLICATIONS

Jiang Guo et al., "Revisiting Embedding Features for Simple Semi-supervised Learning", Proceedings of the 2014 Conference on Empirical Methods in Natural Language Processing (EMNLP), Oct. 25-29, 2014, pp. 110-120, Doha, Qatar.

Jacob Devlin et al., "BERT: Pre-training of Deep Bidirectional Transformers for Language Understanding", In Proceedings of the Conference on NAACL, arXiv.org > cs > arXiv:1810.04805, 2019, 16 pages.

Jenny Rose Finkel et al., "Incorporating non-local information into information extraction systems by Gibbs sampling", ACL '05: Proceedings of the 43rd Annual Meeting on Association for Computational Linguistics, https://doi.org/10.3115/1219840.1219885, Jun. 2005, pp. 363-370.

Pranav Rajpurkar, et al. "SQuAD: 100,000+ Questions for Machine Comprehension of Text", Proceedings of the 2016 Conference on Empirical Methods in Natural Language Processing, Nov. 1-5, 2016, pp. 2383-2392, Austin, Texas.

Jiang Guo et al., "Revisiting Embedding Features for Simple Semi-supervised Learning", Proceedings of the 2014 Conference on Empirical Methods in Natural Language Processing (EMNLP), https://aclanthology.org/D14-1012, Oct. 25-29, 2014, pp. 110-120, Doha, Qatar.

PCT International Search Report and Written Opinion for International Application No. PCT/US2021/046788 dated Nov. 9, 2021, 8 pages.

* cited by examiner

INVOICE

East Repair Inc.
1912 Harvest Lane
New York, NY 12210

| BILL TO | SHIP TO | | |
|---|---|---|---|
| John Smith | John Smith | INVOICE # | US-001 |
| 2 Court Square | 3787 Pineview Drive | INVOICE DATE | 11/02/2019 |
| New York, NY 12210 | Cambridge, MA 12210 | P.O.# | 2312/2019 |
| | | DUE DATE | 26/02/2019 |

| QTY | DESCRIPTION | UNIT PRICE | AMOUNT |
|---|---|---|---|
| 1 | Front and rear brake cables | 100.00 | 100.00 |
| 2 | New set of pedal arms | 15.00 | 30.00 |
| 3 | Labor 3hrs | 5.00 | 15.00 |
| | | Subtotal | 145.00 |
| | | Sales Tax 6.25% | 9.06 |
| | | TOTAL | $154.06 |

INVOICE

East Repair Inc.
1912 Harvest Lane
New York, NY 12210

BILL TO
John Smith
2 Court Square
New York, NY 12210

SHIP TO
John Smith
3787 Pineview Drive
Cambridge, MA 12210

| | |
|---|---|
| INVOICE # | US-001 |
| INVOICE DATE | 11/02/2019 |
| P.O.# | 2312/2019 |
| DUE DATE | 26/02/2019 |

| QTY | DESCRIPTION | UNIT PRICE | AMOUNT |
|---|---|---|---|
| 1 | Front and rear brake cables | 100.00 | 100.00 |
| 2 | New set of pedal arms | 15.00 | 30.00 |
| 3 | Labor 3hrs | 5.00 | 15.00 |
| | Subtotal | | 145.00 |
| | Sales Tax 6.25% | | 9.06 |
| | TOTAL | | $154.06 |

INVOICE

Bast Repair Inc.
1912 Harvest Lane
New York, NY 12210

BILL TO
John Smith
2 Court Square
New York, NY 12210

SHIP TO
John Smith
3787 Pineview Drive
Cambridge, MA 12210

INVOICE #          US-001
INVOICE DATE       11/02/2019
P.O.#              2312/2019
DUE DATE           26/02/2019

| QTY | DESCRIPTION | UNIT PRICE | AMOUNT |
|---|---|---|---|
| 1 | Front and rear brake cables | 100.00 | 100.00 |
| 2 | New set of pedal arms | 15.00 | 30.00 |
| 3 | Labor 3hrs | 5.00 | 15.00 |

Subtotal        145.00
Sales Tax 6.25%   9.06
TOTAL         $154.06

What is the shipping address?

John Smith 3787 Pineview Drive Cambridge, MA 12210

SYSTEM AND METHOD TO EXTRACT INFORMATION FROM UNSTRUCTURED IMAGE DOCUMENTS

RELATED APPLICATION

This application claims the benefit of U.S. Provisional Patent Application No. 63/067,714, filed Aug. 19, 2020, entitled, "SYSTEM AND METHOD TO EXTRACT INFORMATION FROM UNSTRUCTURED IMAGE DOCUMENTS," the entirety of which is incorporated herein by reference.

TECHNICAL FIELD

The present disclosure generally relates to automatically extracting relevant information from unstructured image documents irrespective of whether the layout of the image document is known.

BACKGROUND

Automatic information extraction from unstructured images is important for various applications, such as, workflow automation that needs to take action based on certain values in incoming messages, automatic form filling applications that need to extract field values associated with certain entities found in the form, and applications that convert values found in unstructured images to structured data with a defined schema as in databases.

Traditional extraction methods involve passing an image document directly to an optical character recognition (OCR) model. Without any understanding of the layout of the document, these methods suffer in recognizing independent chunks of information. Present disclosure tackles that problem by using an algorithm that detects text clusters.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

The present disclosure involves using a combination of image processing and natural language processing based on machine learning to extract known fields from a given unstructured image document, whose layout and format is unknown. The type of the document may be known, i.e. whether it is an invoice or a prescription or other type of document may be known a priori.

One aspect of the disclosure is converting an image document into multiple smaller images based on a text cluster detection algorithm.

Another aspect of the disclosure is to use a text classification model to classify the text clusters obtained after OCR of the smaller images into one of the pre-determined fields based on the document type.

Yet another aspect of the disclosure is to convert the text extraction problem into a question-answering problem where fixed questions are formed on the basis of the fields determined in the previous step and the final answer is obtained by passing the output of the question-answering model to a field-specific rule-based filter.

Specifically, a computer-implemented method (and a system implementing the method) is disclosed for recognizing relevant information from an unstructured image. The method comprises: receiving an unstructured image document as input; dividing the unstructured image document into a plurality of smaller images using an image processing technique; performing an optical character recognition (OCR) operation on the plurality of the smaller images to generate a corresponding plurality of text outputs; classifying the plurality of text outputs using a trained machine learning model configured to classify text; and, using a combination of a pre-trained question-answering model and rule-based filters to obtain a final answer from the classified plurality of text outputs.

The image processing technique may be a text clustering technique that may apply morphological transformations like dilation on one or both axes to generate bounding boxes around text clusters. Neighboring bounding boxes may be merged based on whether originally generated bounding boxes could extract the desired key-value pairs, i.e. field types paired with the values. The merging decision may be based on whether the centroid height difference between the neighboring bounding boxes are below a certain threshold.

The trained machine learning model to which the plurality of text outputs obtained after performing the OCR operation individually on the plurality of smaller images is fed may comprise a deep neural network model that learns from word sequences to classify into one or more predetermined field types.

BRIEF DESCRIPTION OF THE DRAWINGS

The present disclosure will be understood more fully from the detailed description given below and from the accompanying drawings of various embodiments of the disclosure.

Specifically, FIG. 3 depicts an intermediate snapshot of the image processing layer in the text cluster detection algorithm. FIG. 4 depicts another intermediate snapshot of the image processing layer in the text cluster detection algorithm at a later point of time compared to the snapshot depicted in FIG. 3. FIG. 5 depicts one of the later snapshots of the image processing layer in the text cluster detection algorithm, i.e., at an even later point of time compared to the snapshot depicted in FIG. 4. Each iteration dilates the image further.

DETAILED DESCRIPTION

Overview

Embodiments of the present disclosure are directed to automatically extracting relevant information from unstructured image documents even when the layout of the image document is unknown. An algorithm, referred to as "text cluster detection algorithm" disclosed here extracts information after automatically understanding the document layout.

The extraction technique is content-driven and not dependent on the layout of a particular document type, or what is the format of the document. The disclosed method breaks down an image document into smaller images using the text cluster detection algorithm that can work on an unstructured image document. The smaller images are converted into text samples using optical character recognition (OCR). Each of the text samples is fed to a trained machine learning model. The model classifies each text sample into one of a plurality of pre-determined field types. The desired value extraction problem may be converted into a question-answering problem using a pre-trained model. A fixed question is formed on the basis of the classified field type. The output of the question-answering model may be passed through a rule-based post-processing step to obtain the final answer.

Figure 1:
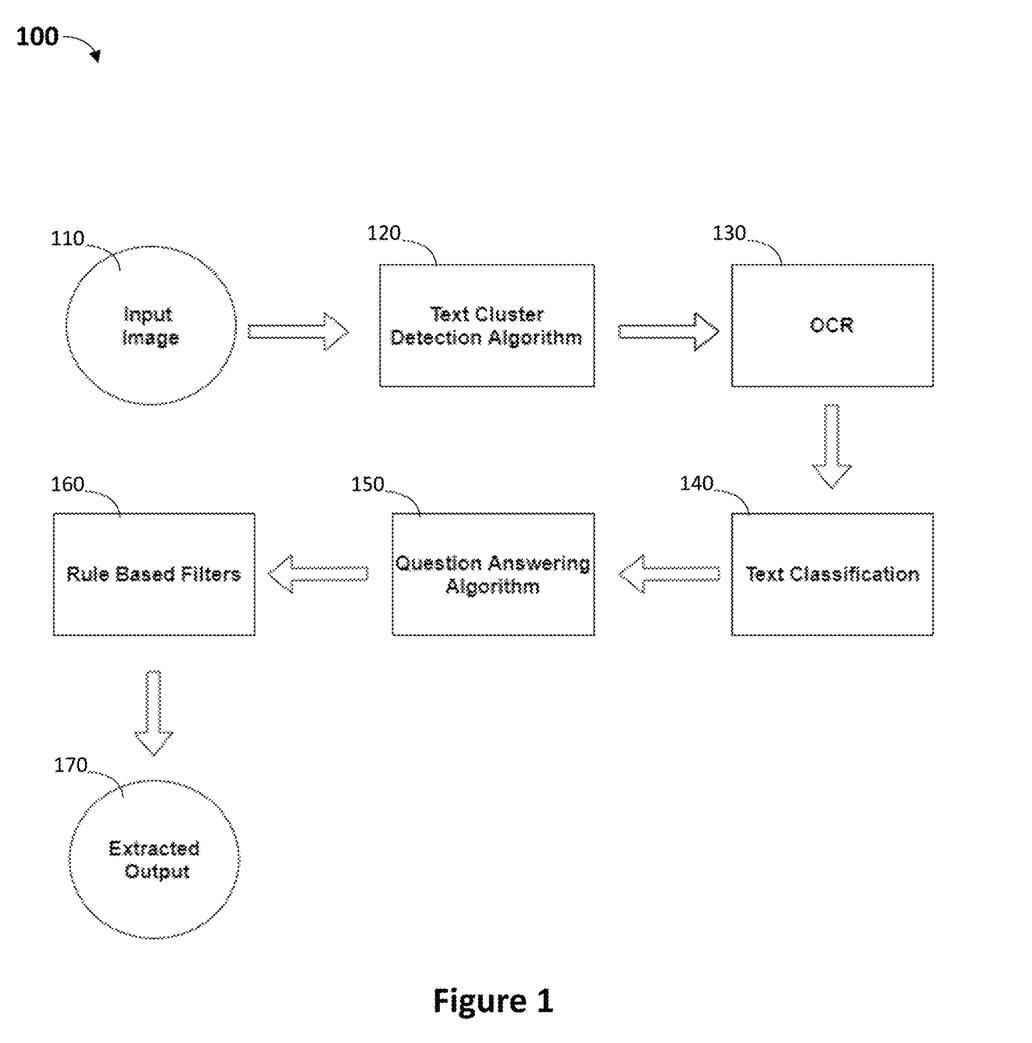
FIG. 1 is a flow diagram of the process to extract information from unstructured images by understanding the layout of the image and the text clusters, according to an embodiment of the present disclosure.

FIG. 1 is a flow diagram of an example high-level method 100 of automatic information extraction as implemented by a component operating in accordance with some embodiments of the present disclosure. The method 100 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 100 is performed by the information extraction component 1013 shown in FIG. 10. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. The information extraction component can have sub-components, as described below. Each of the sub-components may involve text-based or vision-based processing.

Figure 2:
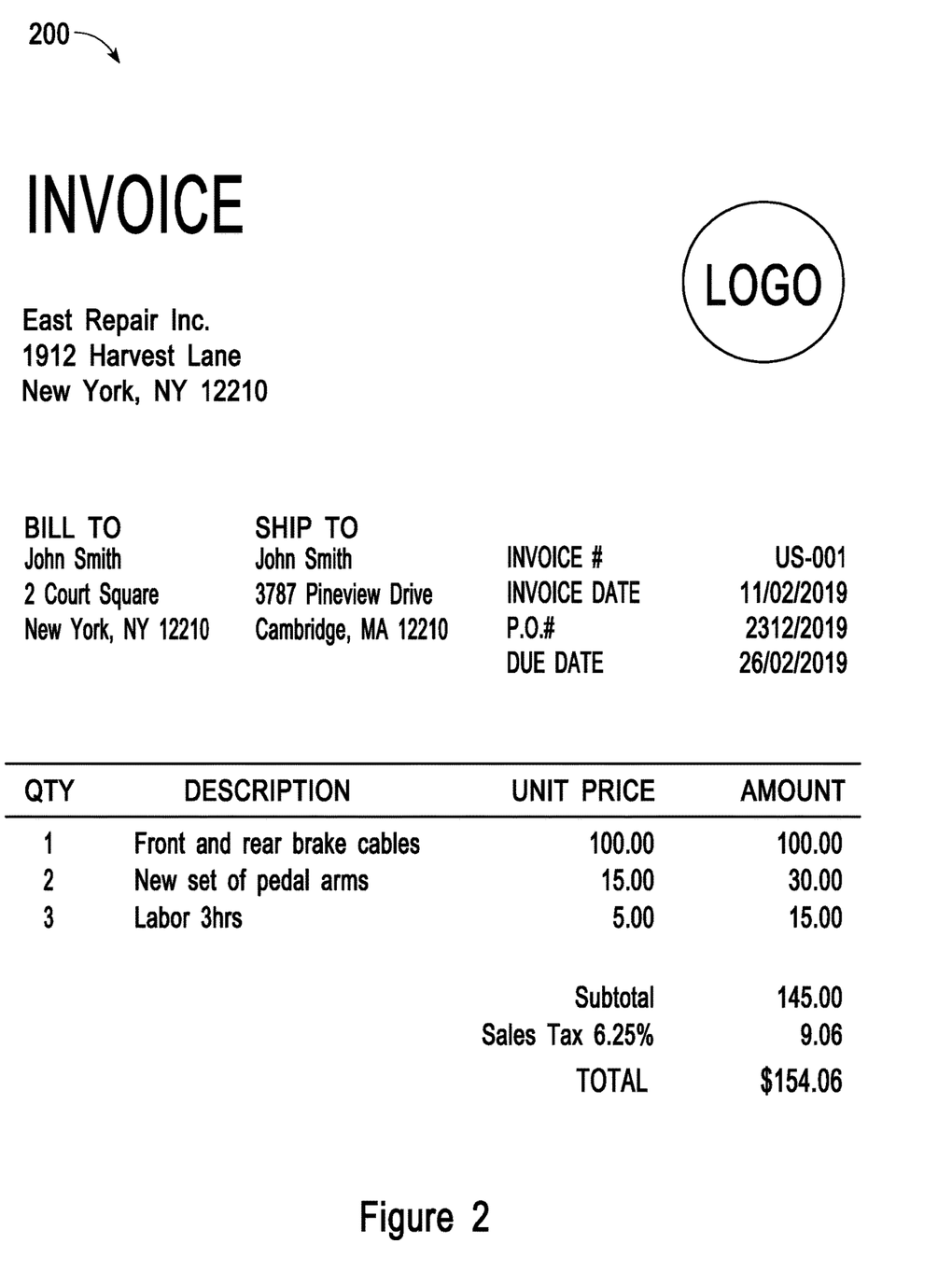
FIG. 2 represents a sample input image, according to an embodiment of the present disclosure.

At operation 110, an input image, such as what is shown in FIG. 2, is provided. This input image can be an invoice, in a non-limiting illustrative example. Though other types of input images, for example, an insurance bill, a health record, an educational institute record, a juristic record or any other record/document can be used as the input image.

At operation 120, a processor in a computing machine executes the disclosed text cluster algorithm, which is described in greater detail below.

At operation 130, output of the text cluster algorithm is provided to an optical character recognition (OCR) program.

At operation 140, the output from the OCR program, i.e. the results of running the OCR on the clustered texts are fed to a classification algorithm so that the results can be categorized into predetermined fields (or entity) types. Note that in some embodiments neural network models may be used in operation 140 to classify text. For example a deep neural network model, such as Bidirectional Encoder Representations from Transformers (BERT) model may be used.

At operation 150, the classified texts are fed to a question-answer algorithm in an attempt to find a final answer.

At operation 160, optionally some rule-based filters are applied to the output of the question-answer algorithm.

At operation 170, the final answer is output which is the extracted value that is automatically generated by the algorithms described in the above operations.

Text Cluster Detection Algorithm

FIG. 2-6 depict the end to end working of the text cluster detection algorithm. In this algorithm, an input image is run through multiple steps of morphological transformations in an iterative fashion. The morphological transformations dilate the image until a minimum number of independent dilated clouds (similar to blobs) are formed. The clouds are then used to form boxes in the image. Each box represents a separate text cluster. After retaining the original boxes (known as the primary boxes), some of the boxes may optionally be merged together based on the difference in the center heights (i.e. location of the centroid) of the neighboring boxes (known as the secondary boxes). This is described below with respect to FIG. 9.

For certain embodiments, e.g., for certain detected types of documents, the above steps may be repeated again with slight variations. For example, the dilations can be biased along one of the two axes. In an exemplary embodiment, the y-axis dilations may be slowed down by a user-selected or automatically determined factor (e.g., a factor of 3) compared to the x-axis dilations, or vice versa. This scaling step may be repeated for both the axes sequentially or in parallel. This repetition results in four (4) more sets of boxes, namely, x-primary, x-secondary, y-primary and y-secondary.

One or more sets of boxes from the possible six (6) sets of boxes described above (i.e. primary boxes, secondary boxes, x-primary boxes, x-secondary boxes, y-primary boxes and y-secondary boxes are then individually (or in combination) run through an optical character recognition (OCR) program to obtain an array of text samples for further processing.

Natural Language Processing

The array of text samples obtained from the OCR program are then fed into a text classification model. This model can be a machine-learning model that has been trained on similar text samples to predict one of the predetermined field types for a particular document (or document type). The model can also support multi-label classification and can classify a text sample into more than one of the known field types. This part of the method helps in improving the accuracy of the overall system. This model can be based on deep neural network.

Further Details of the Information Extraction Process Flow

FIG. 2 represents a sample input image, according to an embodiment of the present disclosure. Specifically, the illustrative example of input image shown here is an invoice showing the standard fields, such as "bill to" address, "ship to" address, Invoice number, invoice date and details of the shipment and pricing. This document does not have to have a familiar layout, i.e. it can be a previously unseen document. It can have any layout or any format. This input image is fed to the algorithmic flow 100 described in FIG. 1.

Figure 3:
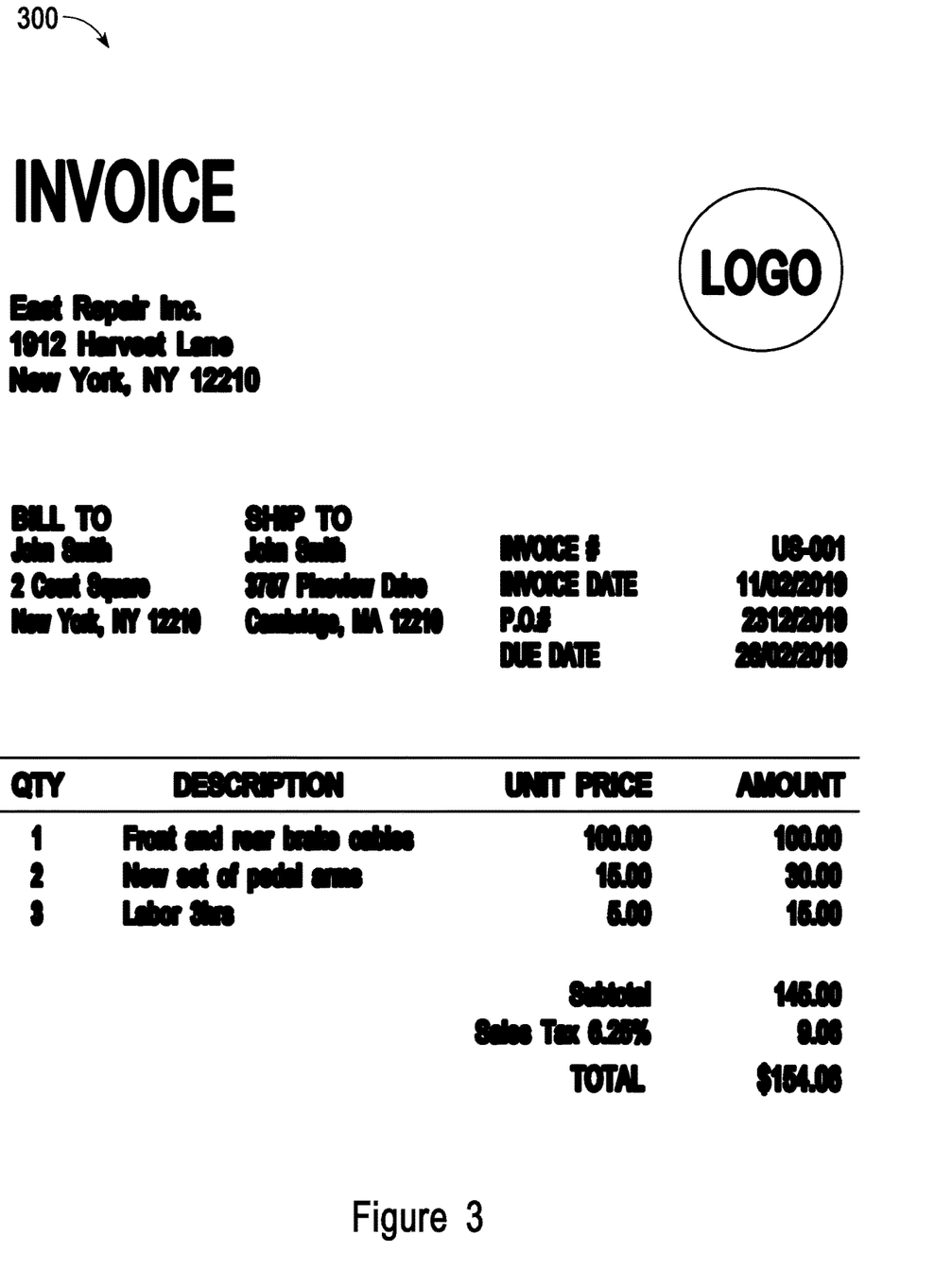
FIGS. 3-5 depict few of the intermediate representations of the image in the text cluster detection algorithm, according to an embodiment of the present disclosure.
Figure 4:
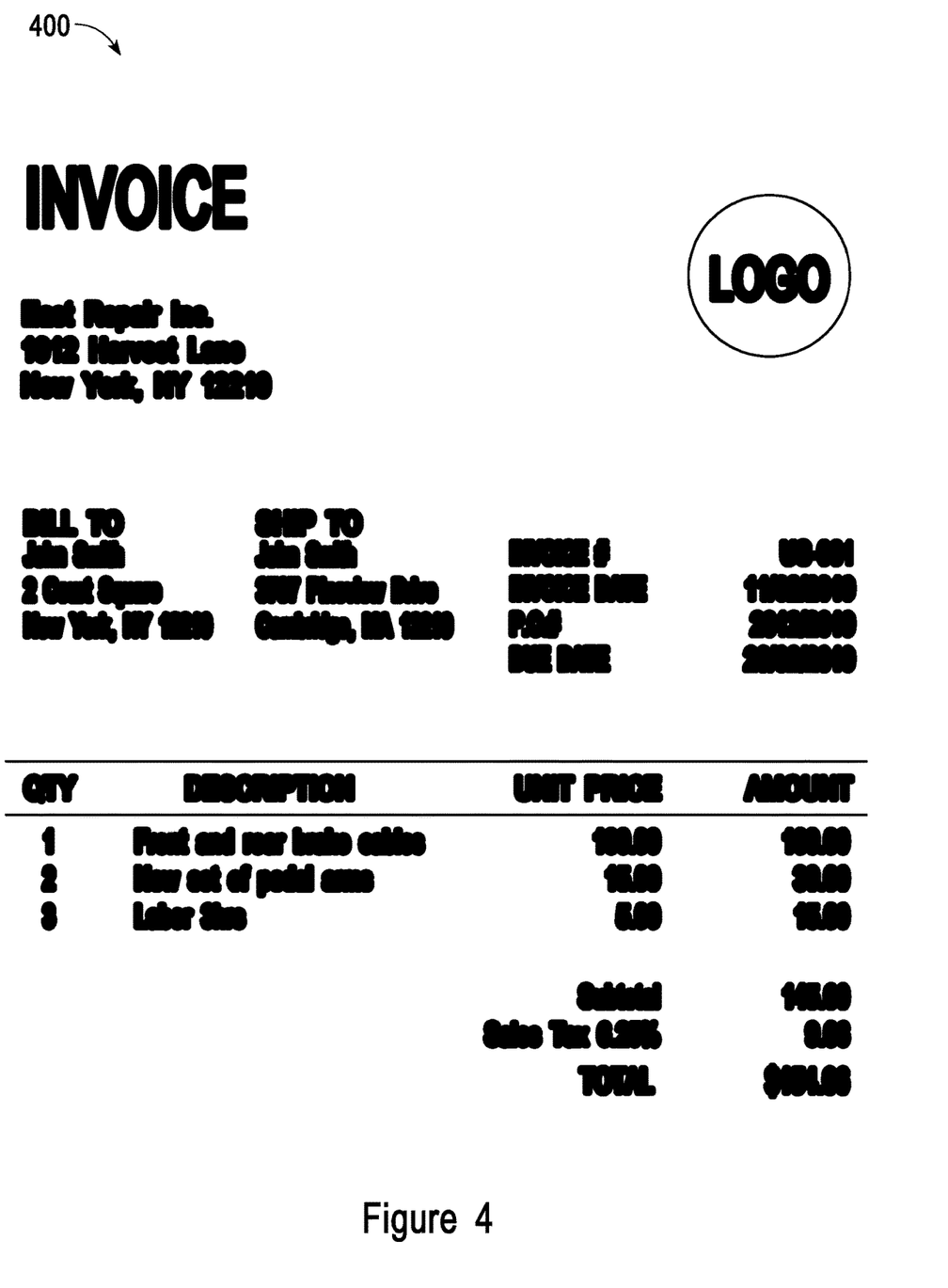
Figure 5:
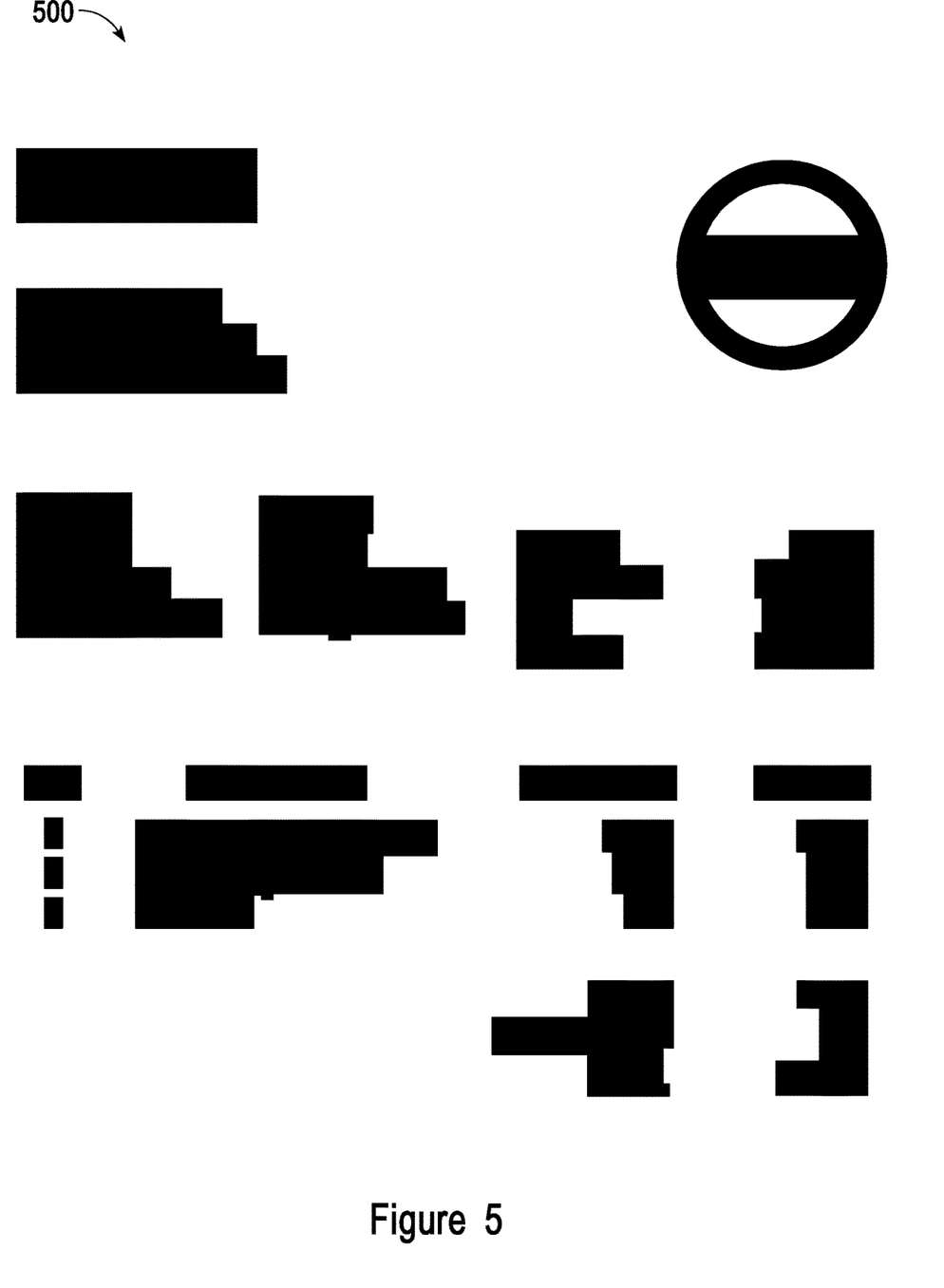

The text cluster detection algorithm employs image processing techniques that generate intermediate snapshots as the algorithm progresses. FIG. 3 depicts an intermediate snapshot 300 of the image processing layer in the text cluster detection algorithm. FIG. 4 depicts another intermediate snapshot 400 of the image processing layer in the text cluster detection algorithm at a later point of time compared to the snapshot depicted in FIG. 3. FIG. 5 depicts one of the later snapshots 500 of the image processing layer in the text cluster detection algorithm, i.e., at an even later point of time compared to the snapshot depicted in FIG. 4. Each iteration dilates the image further. Dilation is a morphological operation that adds pixels to the boundaries of objects in an image. The number of pixels added (or removed if it is an erosion process) from the objects in an image depends on the size and shape of the structuring element used to process the image.

Figure 6:
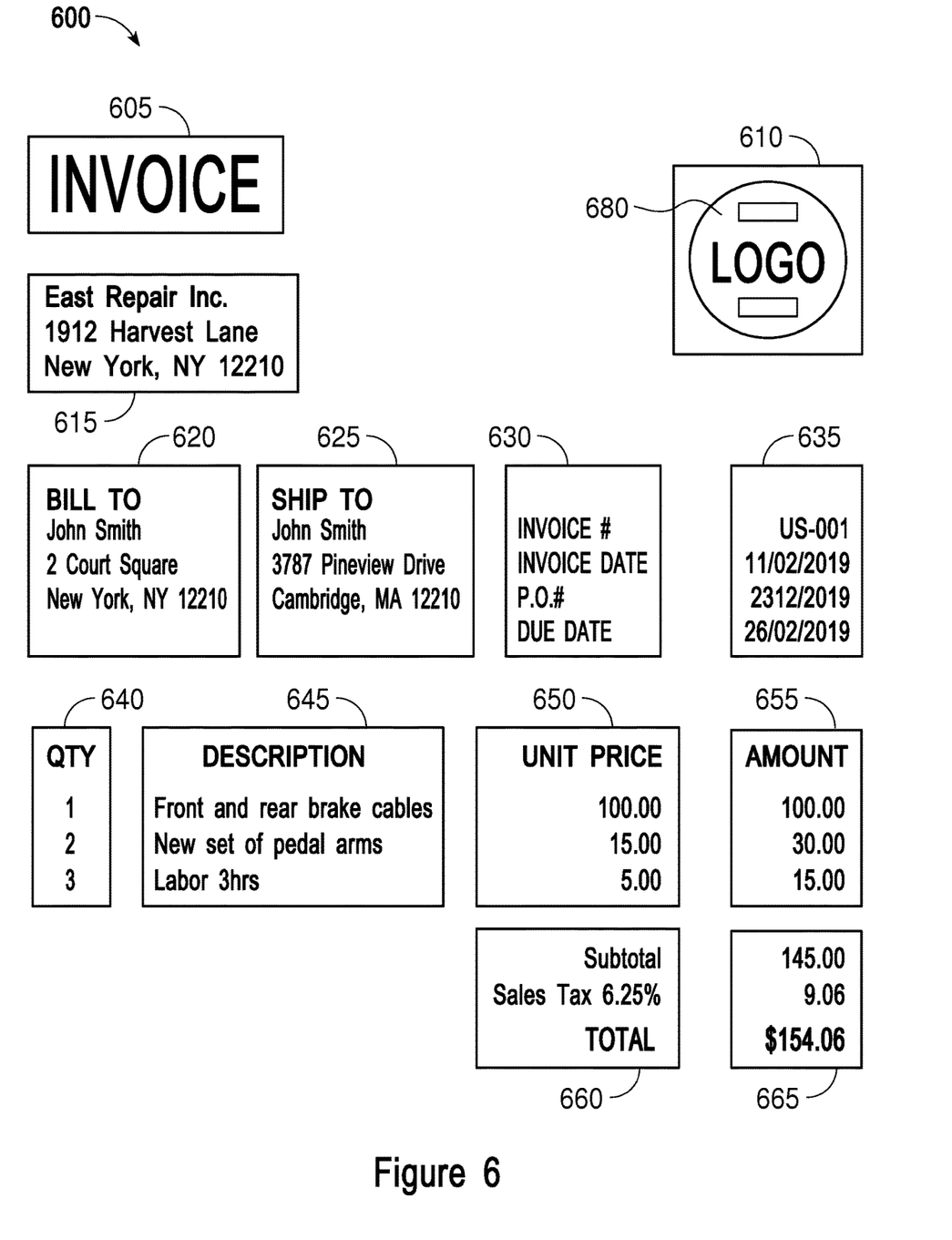
FIG. 6 is the output of the text cluster detection algorithm, according to an embodiment of the present disclosure. Rectangular contours are drawn for each of the text clusters found by the algorithm.

FIG. 6 is the output of the text cluster detection algorithm, according to an embodiment of the present disclosure. Rectangular contours ("bounding boxes" or simply "boxes") are drawn for each of the text clusters found by the algorithm. Boxes 605, 610, 615, 620, 625, 630, 635, 640, 645, 650, 655, 660 and 665 denote text clusters. Additional bounding boxes, such as 680 on top of the LOGO (and a similar box below the LOGO) may be formed within another box (e.g., box 610).

The OCR outputs on the clustered texts can be fed to a trained machine learning model. The machine learning model can comprise a deep neural network model that learns from word sequences to classify into one or more predetermined field types. The deep neural network model may comprise a text classification model. The deep neural network may also be based on Bidirectional Encoder Representations from Transformers (BERT) model.

Figure 7:
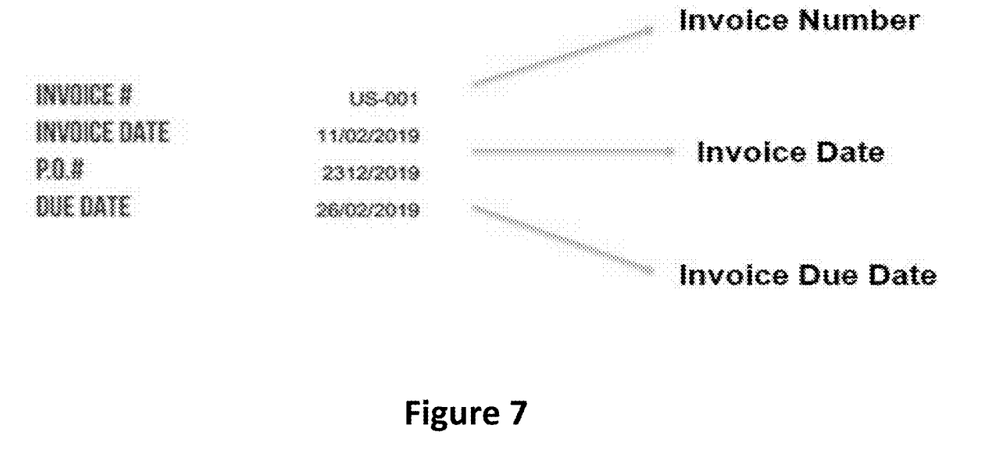
FIG. 7 depicts a working example of the text classifier model where it classifies each of the rectangular contours into one or more of the desired categories (key types), according to an embodiment of the present disclosure.

FIG. 7 depicts a working example of the text classification model where it classifies each of the rectangular contours into one or more of the desired categories (key types), according to an embodiment of the present disclosure. For example, the desired categories can be invoice number, invoice date, invoice due date (i.e. when payment is due) when it is known that the input image was an invoice. The categories are also referred to as "fields" or "field types".

Figure 8:
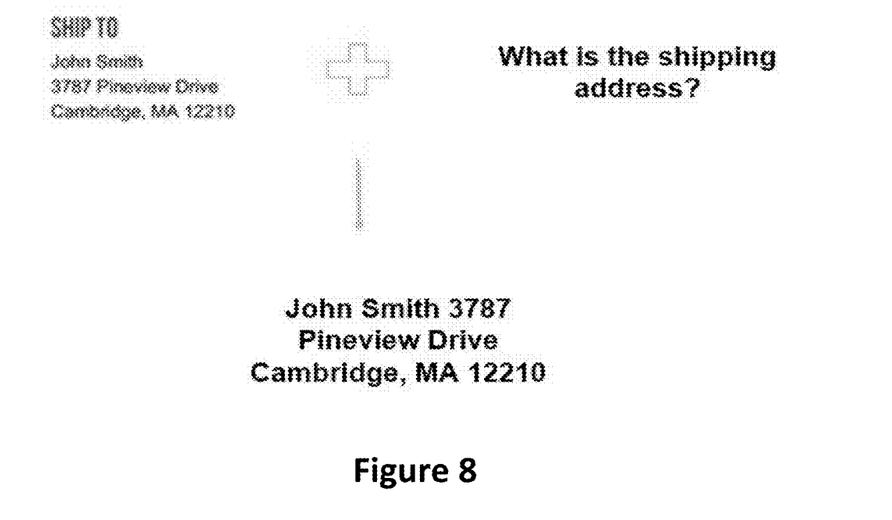
FIG. 8 depicts a working example of the question-answering algorithm where it frames a question to extract the final answer, according to an embodiment of the present disclosure. A question is formed based on the extracted entity from the text classification component. The question-answering model outputs the associated value with the key type.

FIG. 8 depicts a working example of the question-answering algorithm where it frames a question to extract the final answer, according to an embodiment of the present disclosure. A question is formed based on the extracted entity from the text classification component. The question-answering model outputs the associated value with the key type. In this particular example, the sample text had "Ship to" address. The model asked the question "what is the shipping address?" and the extracted answer is "John Smith 3787 Pineview Drive, Cambridge, Mass. 12210." This answer can be further refined by using rule-based filters to separate the name "John Smith" from the street address "3787 Pineview Drive").

Figure 9:
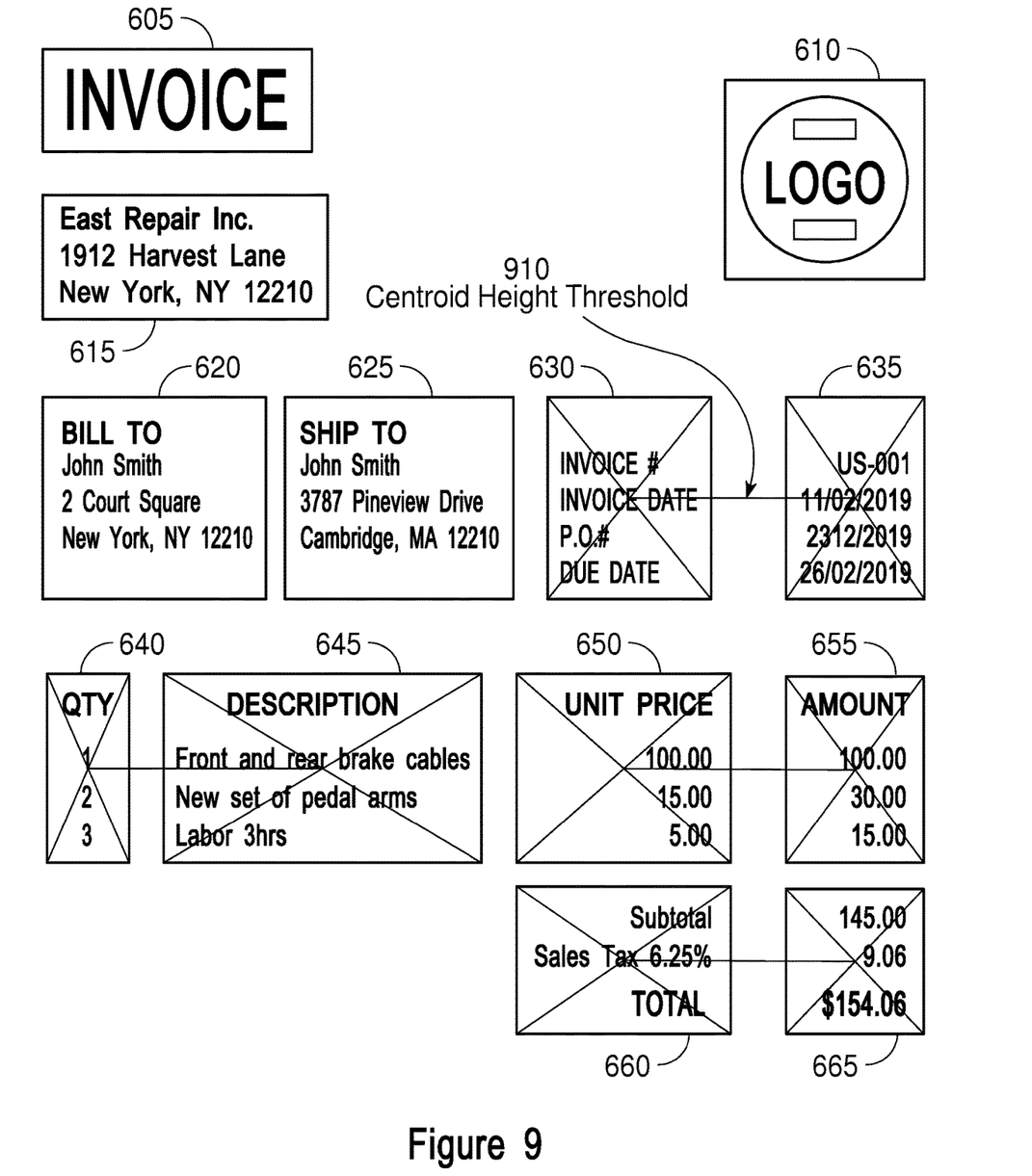
FIG. 9 illustrates the concept of compound box, according to an embodiment of the present disclosure. If the required entity types are not found from the boxes obtained from the text cluster algorithm, compound boxes are formed by merging adjacent boxes. And then the rest of the algorithmic pipeline then proceeds using the merged compound boxes.

FIG. 9 illustrates the concept of compound box, according to an embodiment of the present disclosure. As shown in FIG. 6, each box (605, 610, . . . 675, 680) represents a separate text cluster. After retaining the original boxes (known as the primary boxes), some of the boxes may optionally be merged together based on the difference in the center heights (i.e. location of the centroid) of the neighboring boxes (known as the secondary boxes). If the required entity types are not found from the boxes obtained from the text cluster algorithm, compound boxes are formed by merging adjacent neighboring boxes.

For example, in FIG. 9, for the primary box 630, a secondary box is 635. Whether the boxes 630 and 635 are to be merged depends on whether the difference in absolute heights of the centroids of the boxes 630 and 635 is within a user-selected or automatically determined threshold. The centroids for each box is at the intersection of the two diagonals. The centroid height threshold 910 may be a certain percentage of the height of the boxes in consideration. For example, it may be 1% of the height of the boxes in consideration. The centroid height difference is only considered in the vertical direction. No horizontal length is typically being considered for merge decision. In a similar fashion, whether boxes 650 and 655 will be merged, or whether boxes 660 and 665 should be merged, or whether boxes 640 and 645 should be merged depends on the centroid height difference threshold.

Once the merging decision is made, the rest of the algorithmic pipeline then proceeds as described above, the only difference being the algorithm now uses the merged compound boxes. The compound boxes are used to search for key-value pairs that were not extracted from the original set of boxes. In other words, the decision of merging may be invoked if the required entity types are not found from the original boxes obtained from the text cluster detection algorithm.

Figure 10:
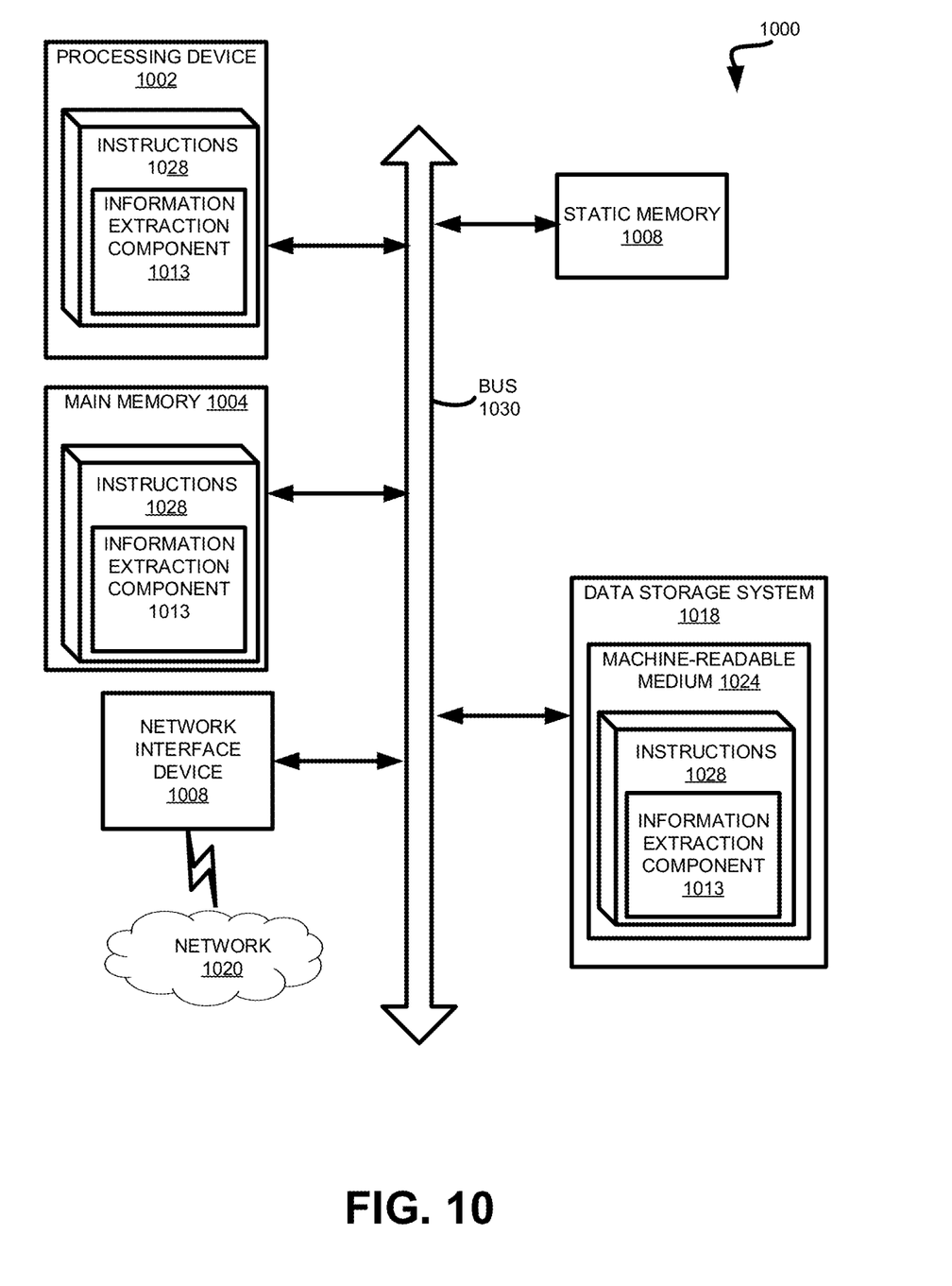
FIG. 10 illustrates an example machine of a computer system within which a set of instructions, for causing the machine to perform any one or more of the methodologies discussed herein, can be executed.

FIG. 10 illustrates an example machine of a computer system 1000 within which a set of instructions, for causing the machine to perform any one or more of the methodologies discussed herein, can be executed. In some embodiments, the computer system 1000 can correspond to a host system that includes, is coupled to, or utilizes a memory sub-system or can be used to perform the operations of a processor (e.g., to execute an operating system to perform operations corresponding to automatic information extraction, also referred to as information extraction component 1013). Note Note that the information extraction component 1013 may have sub-components, for example, text-cluster detection sub-component (this can also have a neighboring boxes merging decision-making component), OCR sub-component, text classification sub-component, question-answering model component, rule-based filter component and an output presentation component. In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1008 (e.g., flash memory, static random access memory (SRAM), etc.), and a data storage system 1018, which communicate with each other via a bus 1030.

Processing device 1002 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. The processing device 1002 is configured to execute instructions 1028 for performing the operations and steps discussed herein. The computer system 1000 can further include a network interface device 1008 to communicate over the network 1020.

The data storage system 1018 can include a machine-readable storage medium 1024 (also known as a computer-readable medium) on which is stored one or more sets of instructions 1028 or software embodying any one or more of the methodologies or functions described herein. The instructions 1028 can also reside, completely or at least partially, within the main memory 1004 and/or within the processing device 1002 during execution thereof by the computer system 1000, the main memory 1004 and the processing device 1002 also constituting machine-readable storage media. The machine-readable storage medium 1024, data storage system 1018, and/or main memory 1004 can correspond to a memory sub-system.

In one embodiment, the instructions 1028 include instructions to implement functionality corresponding to the information extraction component 1013. While the machine-readable storage medium 1024 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A computer-implemented method for recognizing relevant information from an unstructured image, comprising:
   receiving an unstructured image document as input;
   dividing the unstructured image document into a plurality of smaller images using an image processing technique, wherein the image processing technique is based on text cluster detection that originally determines bounding boxes around clusters of texts, and wherein an algorithm for the text cluster detection applies a morphological transformation along one or more axes;

performing an optical character recognition (OCR) operation on the plurality of the smaller images to generate a corresponding plurality of text outputs;

classifying the plurality of text outputs using a trained machine learning model configured to classify text; and using a combination of a pre-trained question-answering model and rule-based filters to obtain a final answer from the classified plurality of text outputs.

2. The method of claim 1, wherein the image processing technique is agnostic of a layout of the unstructured image document.

3. The method of claim 1, wherein the image processing technique is agnostic of a format of the unstructured image document.

4. The method of claim 1, wherein neighboring bounding boxes are merged based on proximity of the neighboring bounding box coordinates.

5. The method of claim 4, wherein the neighboring bounding boxes are merged if a centroid height difference between the neighboring bounding boxes is below a predetermined threshold.

6. The method of claim 1, wherein the morphological transformation along a selected axis is scaled to slow down by a pre-selected factor compared to another axis.

7. The method of claim 6, wherein a plurality of sets of bounding boxes are generated by scaling the morphological transformation sequentially on both axes.

8. The method of claim 7, the plurality of sets of bounding boxes are fed to the OCR operation along with original bounding boxes generated by the text cluster algorithm.

9. The method of claim 1, wherein the trained machine learning model to which the plurality of text outputs obtained after performing the OCR operation individually on the plurality of smaller images is fed comprises a deep neural network model that learns from word sequences to classify into one or more predetermined field types.

10. The method of claim 9, where the deep neural network model comprises a text classification model.

11. The method of claim 9, where the deep neural network is based on Bidirectional Encoder Representations from Transformers (BERT) model.

12. The method of claim 1, where the pre-trained question answering model is used to fetch one or more relevant answers corresponding to each of the plurality of text outputs.

13. The method of claim 1, where an output of the question-answering model is passed through the one or more rule-based filters to obtain the final answer.

14. A system for recognizing relevant information from an unstructured image, where a computer processor performs the operations of:

receiving an unstructured image document as input;

dividing the unstructured image document into a plurality of smaller images using an image processing technique, wherein the image processing technique is based on text cluster detection that determines original bounding boxes around clusters of texts, and wherein an algorithm for the text cluster detection applies a morphological transformation along one or more axes;

performing an optical character recognition (OCR) operation on the plurality of the smaller images to generate a corresponding plurality of text outputs;

classifying the plurality of text outputs using a trained machine learning model configured to classify text; and using a combination of a pre-trained question-answering model and rule-based filters to obtain a final answer from the classified plurality of text outputs.

* * * * *